Figure 1:
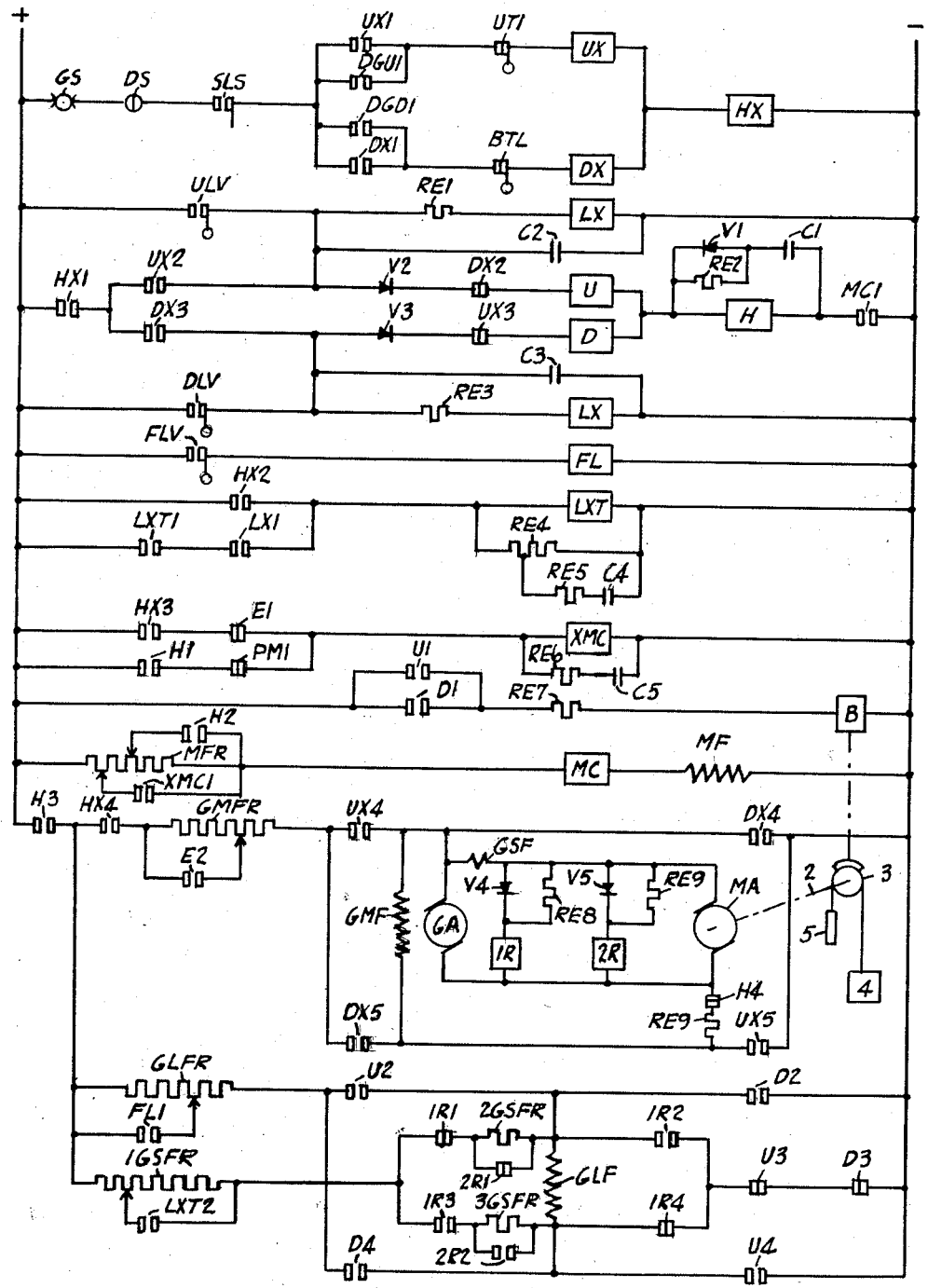

WILLIAM HENRY BRUNS INVENTOR

United States Patent Office 2,846,027
Patented Aug. 5, 1958

2,846,027

ELEVATOR CONTROL SYSTEM

William Henry Bruns, Lincolndale, N. Y., assignor to Otis Elevator Company, New York, N. Y., a corporation of New Jersey Application March 15, 1957, Serial No. 646,345

16 Claims. (Cl. 187—29)

This invention relates to control systems for elevators, especially to systems for controlling the operation of elevator hoisting motors.

There are many factors which dictate the control of the hoisting motor for an elevator car. The time consumed in performing various operations is an important factor, especially in the case of high speed systems. Minimizing the time consumed in these various operations not only increases traffic handling capacity, and thus the efficiency of the service provided the passengers and intending passengers, but in some cases, especially in high rise multi-elevator installations, may reduce the number of elevators required to service the building and thus open up considerable additional space for tenants. Thus any time that can be saved in the operation of elevators is important.

Another factor is the feeling to the occupants of the car during the different control operations, as, for example, during starting a stopping the car, and in bringing the car to the landing level by leveling mechanism. Smoothness is highly desirable in these operations, and it is important that smoothness be effected without sacrifice of operating time.

Still another factor is the control of the operation of the hoisting motor so as to increase the accuracy of stop of the car. In other words, it is highly desirable to minimize the extent of the so-called "dead zone," that is, the zone with respect to the landing in which the car is brought to a stop.

In installations in which the elevator hoisting motor is a direct current motor and is supplied with current from a variable voltage direct current generator of a motor-generator set, the residual magnetism of the generator field exerts considerable influence on the control of operation of the motor. For example, in leveling, when the car tends to come to a stop out of level with the floor at which the stop is being made, the residual flux aids in bringing the car to the floor level in the direction of car travel and opposes the action of bringing the car to the floor level in the opposite direction. It has been proposed in the patent to Davis No. 1,680,771, granted April 14, 1928, to compensate for effects of the residual flux of the generator field during the leveling of the car so as to provide for any particular load the same generator voltage for bringing the car to the floor level, regardless of whether it underruns or overruns the floor.

Residual flux also affects the operation of the car in bringing it back to the floor in case of contraction or stretching of the hoisting ropes due to changes in load while the car is stopped at the floor, tending to assist in bringing it to the floor in the same direction as it initially approached the floor, and to oppose bringing it to the floor in the direction opposite to that in which it initially approached the floor. Also, in starting the elevator car, the residual flux may be in a direction to assist or oppose that due to generator separate excitation, thus resulting in a different feeling to passengers.

In the final stopping operation, upon disconnection of the generator field from the supply lines, the generator voltage due to residual is of a polarity to cause the car to run in the direction that the car initially approached the floor. Thus the effect of residual opposes the action of stopping the car when the car is running in the direction it initially approached the floor and assists in stopping the car when the car is running in the opposite direction.

It is an object of the invention to compensate for the effects of residual flux of the generator not only during leveling of the elevator car in case of underrun of overrun, but during correction for contraction or stretching of the hoisting ropes while stopped at a landing and during the main operation as well.

It is also an object of the invention to balance out the residual flux of the generator in the final stopping operation.

In carrying out the invention according to the preferred arrangement, in the initial start of the car in a given direction and the car reaching a certain speed, circuits are set up for compensating for the effects of residual flux, which circuits remain effective for the duration of the trip in that direction and until the car is started in the reverse direction and attains a certain speed. When this certain speed in the reverse direction is attained, circuits are set up for compensating for the effects of residual flux, which circuits remain effective for the duration of the trip in that direction and until the car is again started in the first direction and attains the certain speed. The compensating action takes place in starting the car either on main operation or during leveling when the residual flux acts to oppose the generator excitation called for and involves increasing the excitation to compensate for the reduction in excitation due to residual. In stopping, upon the discontinuance of generator separate excitation as the car is being brought to a final stop, the generator is excited in a direction and amount to balance out the residual component of the flux. A time delay is provided after the final stop before the usual "suicide" connections are established to avoid interfering with the stopping operation.

Advantages of the invention wll be apparent from the above and from the following description and appended claims.

Figure 1A:
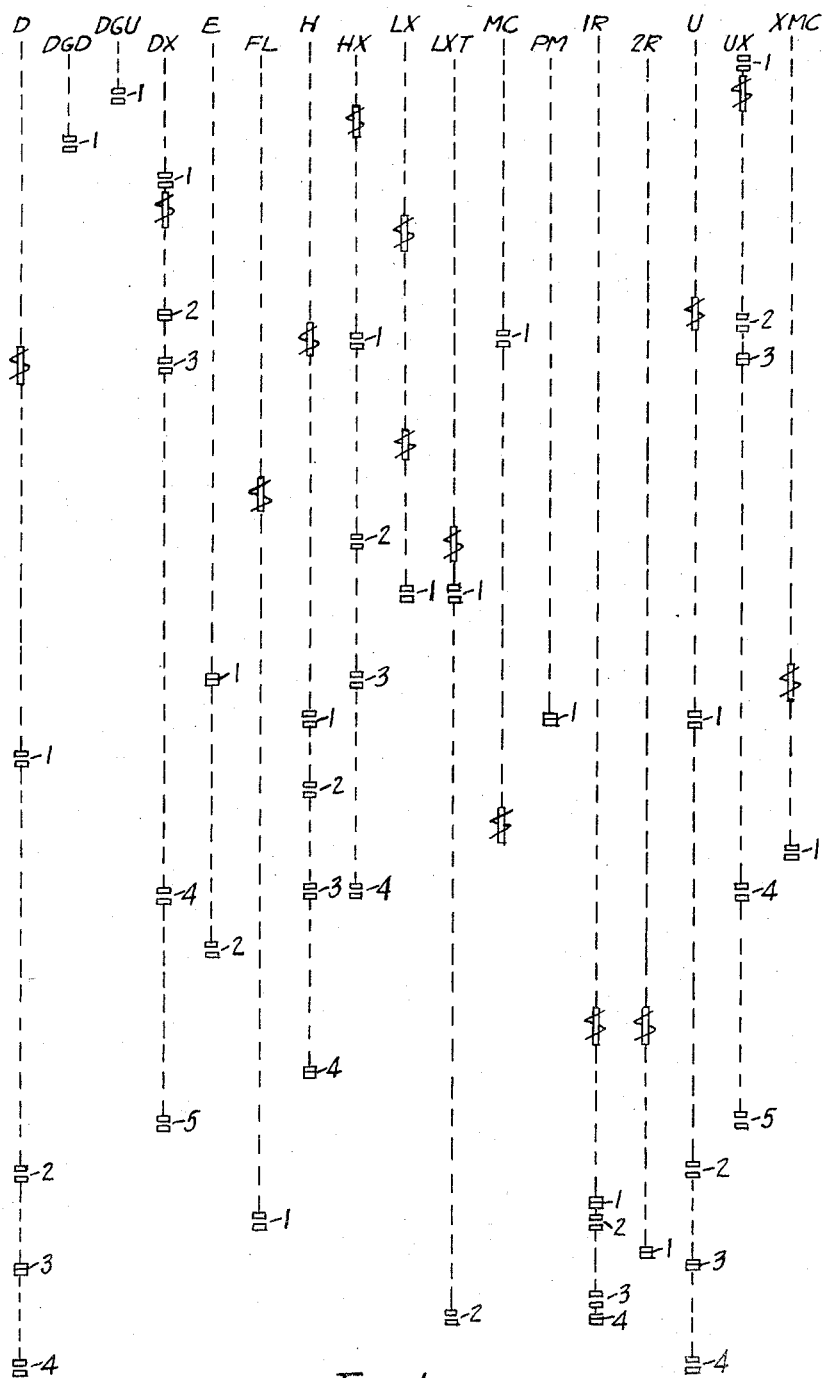

In the drawings:

Figure 1 is a representation in "across-the-line" form of circuits for effecting the desired control of an elevator hoisting motor in accordance with the invention; and Figure 1a is a key diagram showing in spindle form the relationship of the coils and contacts of the switches employed in Figure 1.

The circuits are shown in a simplified manner to facilitate an understanding of a preferred mode of carrying out the invention. In this connection it should be understood that elevator control systems are very complex and that certain amplifications and alterations may be in order in adapting the invention to certain of these systems. The invention will be described as applied to a system in which the car is operated without an attendant, but it is to be understood that it is applicable to other types of elevator systems.

The electromagnetic switches employed in the system illustrated are designated as follows:

D—Down direction switch
DGD—Auxiliary down direction switch
DGU—Auxiliary up direction switch
DX—Down main direction switch
E—Speed switch
FL—Fast speed leveling switch
H—Field and brake switch
HX—main field and brake switch
LX—Rope compensation switch LXT—Rope compensation time relay
MC—Motor field current switch
PM—Pawl magnet (on selector)
1R—First residual compensation switch
2R—Second residual compensation switch
U—Up direction switch
UX—Up main direction switch
XMC—Auxiliary motor field current switch The electromagnetic switches are illustrated in de-energized condition. For purposes of simplification, the coils of switches DGD, DGU, and E, and of pawl magnet PM are not shown. These may be controlled, for example, as shown in the patent to Glaser et al., No. 2,682,318, granted June 29, 1954. Switch LX has two operating coils. Switches 1R and 2R are of the latching type.

The coil of the electromechanical brake is designated B. The brake is applied to the brake drum on the shaft 2 of the hoisting motor which drives the sheave 3 for raising and lowering the elevator car 4 and counterweight 5. The armature of the elevator hoisting motor is designated MA, and its field winding MF. The elevator motor armature is supplied with current at variable voltage by the armature GA of the generator of the motor generator set. The generator is illustrated as provided with two separately excited field windings, one utilized for main operation being designated GMF and the other utilized for both main and leveling operations being designated GLF. GSF is the generator series field winding. GMFR is resistance for controlling the strength of main field winding GMF, while GLFR is resistance for controlling the strength of auxiliary field winding GLF. 1GSFR, 2GSFR and 3GSFR are resistances utilized in the circuits for compensating for the effects of residual flux of the generator. MFR is resistance for controlling the strength of the elevator motor field winding. Direct current supply lines are designated "+" and "−".

Mechanism actuated in accordance with car movement is utilized, and this may be of the form shown in the patent to E. L. Dunn et al., No. 2,074,578, granted March 23, 1937, in which case switch SLS may be switch 102 of the Dunn et al. patent, and the cams 887 of that patent may be utilized to operate fast speed leveling contacts FLV, up slow speed leveling contacts ULV, and down slow speed leveling contacts DLV. UTL is an upper terminal limit switch and BTL is a bottom terminal limit switch. GS represents the car door contacts, while DS represents the hoistway door contacts, one for each floor, arranged in series relation. Resistors are generally designated as RE, rectifiers as V, and condensers as C.

Operation without an attendant in the elevator car will be described, and for convenience it will be assumed that starting of the car is effected upon the closure of the car door and hoistway door contacts GS and DS and the closing of selector switch SLS. It will further be assumed that the car is set for upward travel, in which event contacts DGU1 are in engagement. Thus, upon the closure of contacts GS, DS, and switch SLS, a circuit is completed through contacts DGU1 and limit switch UTL for the coils of up main direction switch UX and main field and brake switch HX. Switch HX, upon operation, engages contacts HX3 to complete a circuit through contacts E1 for the coil of auxiliary motor field current switch XMC. Switch XMC engages contacts XMC1 to short circuit a portion of resistance MFR to bring the strength of the motor field up to full value. As this condition is attained, switch MC operates to engage contacts MC1, completing a circuit for the coils of up direction switch U and field brake switch H through contacts HX1, UX2, and interlock contacts DX2. Switch H, upon operation, engages contacts H3, which, owing to the fact that switches UX, HX and U are now operated, completes circuits for the generator main field winding GMF and generator auxiliary field winding GLF. The circuit for the main field winding is through contacts H3, HX4, resistance GMFR, contacts UX4, field winding GMF, and contacts UX5. The circuit for the auxiliary field winding is through contacts H3, resistance GLFR, contacts U2, field winding GLF, and contacts U4. At the same time contacts U1 engage to complete a circuit for the brake release coil B. This causes release of the electromechanical brake and, as the generator is now excited, the car is started in the up direction. Upon the operation of switch E, contacts E2 engage to short circuit a portion of resistance GMFR, increasing the excitation of the generator field and thus increasing the speed of the hoisting motor. Also, contacts E1 separate to disconnect the coil of switch XMC from the supply lines. This switch is delayed in dropping out by the discharge of condenser C5 to insure that the hoisting motor has come up to the speed dictated by engagement of contacts E2. On dropping out, switch XMC separates contacts XMC1 to reinsert a portion of resistor MFR in circuit with the motor field winding MF, a portion of this resistance remaining short circuited through contacts H2. This brings the hoisting motor up to full speed. Switch MC remains in operated condition.

Upon picking up a call, the pawl magnet is dropped out, engaging contacts PM1 to re-establish through contacts H1 the circuit for the coil of switch XMC. Switch XMC reengages contacts XMC1 to re-establish full field strength of the hoisting motor for the slowdown operation. As the car arrives at a certain distance from the floor at which the stop is to be made, switch E is dropped out to separate contacts E2. This reinserts resistance GMFR in circuit with generator field winding GMF, decreasing the generator excitation and slowing down the elevator hoisting motor.

As the car arrives in the leveling zone, leveling switch contacts FLV and ULV are engaged. The engagement of contacts FLV completes a circuit for the coil of fast-speed leveling switch FL, while the engagement of contacts ULV completes another circuit, bypassing contacts HX1 and UX2, for the coils of up direction switch U and field and brake switch H. As the car arrives at a certain distance from the floor, selector switch SLS opens to disconnect the coils of switches UX and HX from the supply lines, causing these switches to drop out. As a result, contacts HX4, UX4 and UX5 separate to disconnect generator main field winding GMF from the supply lines. However, the circuit for generator auxiliary field winding GLF is maintained and, as contacts FL1 are now engaged, the elevator motor runs at a fast leveling speed. As the car comes into the slow-speed leveling zone, contacts FLV separate, de-energizing switch FL, which separates contacts FL1 to reinsert a portion of resistance GLFR in circuit with the generator auxiliary field winding, causing the hoisting motor to run at a slow leveling speed. As the car arrives in the dead zone, contacts ULV separate to disconnect the coils of switches U and H from the supply lines. The resultant separation of contacts U2 and U4 disconnects the generator auxiliary field winding from the supply lines. Also, contacts U1 separate to disconnect the brake release coil from the supply lines. As a result, the brake is applied to bring the car to a stop.

The car is operated in the down direction in a similar manner, contacts DGD1 being engaged instead of contacts DGU1 when the car is set for downward travel. During down operation switches DX and D operate instead of switches UX and U, and leveling switch contacts DLV control in bringing the car into the floor instead of contacts ULV.

When the car is initially started in the up direction and attains a certain speed, switch 1R is operated, the coil of this switch being connected across the generator armature GA through rectifier V4. This switch being of the latching type is held in when operated, as, for example, by residual magnetism. Upon operation, switch 1R engages contacts 1R2 and 1R3 and separates contacts 1R1 and 1R4. Thus when the car is set for travel in the up direction, resistance 1GSFR is connected through contacts H3, 1R3 and U4 in parallel with field winding GLF across the supply lines. Resistances 2GSFR and 3GSFR and contacts 2R1 and 2R2 will be referred to later. This condition exists during main operation and during leveling as the car comes into the floor. When the car overruns the floor in making a stop in its upward travel, leveling switch contacts ULV are opened and leveling switch contacts DLV are closed. As a result, switch U is dropped out and switch D is operated so that the circuit for generator field winding GLF is broken at contacts U2 and U4, and is re-established through contacts D2 and D4. This reverses the generator excitation to bring the car back to the landing level. Also, as a result of the engagement of contacts D2 resistance 1GSFR is connected in parallel with resistance GLFR in circuit with the generator auxiliary field winding, the amount of excitation being such as to compensate for the residual flux of the generator field in effecting the return of the car to the landing level.

When the car is initially started in the down direction and attains a certain speed, switch 1R is reset. The circuit, being through resistor RE8, allows enough current to pass to overcome the residual magnetism of the switch, but not enough to cause its reoperation. Upon the switch being reset, contacts 1R1 and 1R4 engage and contacts 1R2 and 1R3 separate. Thus when the car is set for travel in the down direction, resistance 1GSFR is again connected in parallel with field winding GLF across the supply lines, in this case through contacts H3, 1R1, and D2. As in the case of up car travel, this condition exists during main operation and during leveling as the car comes into the floor. When the car overruns the floor in making a stop in its downward travel, leveling switch contacts DLV are opened and leveling switch contacts ULV are closed. As a result, switch D is dropped out and switch U is operated so that the circuit for generator field winding GLF is broken at contacts D2 and D4 and is re-established through contacts U2 and U4. This reverses the generator excitation to bring the car back to the landing level. Also, as a result of the engagement of contacts U4 resistance 1GSFR is connected in parallel with resistance GLFR in circuit with the generator auxiliary field winding, the excitation being such as to compensate for the effects of residual flux in returning the car to the floor.

When circuits are set up for starting the car, the engagement of contacts HX2 completes a circuit for the coil of rope compensation time relay LXT. Also, in starting the car a circuit is set up for one of the operating coils of rope compensation switch LX, this circuit being through contacts HX1 and UX2 and the upper coil of switch LX for up car travel and through contacts HX1 and DX3 and the lower coil of switch LX for down car travel. Switch LXT operates to engage contacts LXT1 to establish a holding circuit through contacts LX1. It also engages contacts LXT2 to short circuit a portion of resistance 1GSFR. When the leveling mechanism takes over, the circuits for the operating coils of switch LX are controlled by the slow-speed leveling switch contacts ULV and DLV. Relay LXT is maintained operated by its holding circuit when the car overruns the floor in making a stop, this being insured by the action of condenser C4 during the momentary dropping out of switch LX. Thus, upon return of the car to the floor after an overrun, contacts LXT2 are in engagement to short circuit a portion of resistance 1GSFR to increase the excitation of the generator field winding GLF to return the car to the floor, thus increasing the speed of the return operation.

When the car is stopped at a floor and should, due to change in load of the car, the hoisting ropes contract or stretch enough to move the car out of the dead zone, the leveling mechanism acts to return the car to the floor landing. Should the return of the car be in a direction opposite to that in which the car initially approached the floor, the residual compensation is effective for exciting field winding GLF, as above described; however, owing to the fact that contacts HX2 are not engaged under this condition, relay LXT is not operated so that contacts LXT2 are not engaged, with the result that a more gradual return of the car to the floor is effected.

Owing to the fact that switch 1R, upon being operated during the initial start of the car in the up direction, remains in operated condition, resistance 1GSFR is connected in parallel with field winding GLF across the supply lines upon each subsequent start of the car in the up direction. However, upon the initial start of the car in the down direction on main operation, owing to the fact that contacts D2 are engaged, resistance 1GSFR is connected in parallel with resistance GLFR in circuit with field winding GLF to compensate for the effects of residual flux to attain a fast start from the floor. As the car reaches a certain speed, switch 1R is reset as before, reconnecting resistance 1GSFR across the supply lines in parallel with field winding GLF through contacts D2. Thus, upon each subsequent start of the car on main operation, resistance 1GSFR is connected in parallel with field winding GLF. In this way the resistance for controlling the excitation of the field winding on main operation may be adjusted to obtain a fast get-away, both on the initial start in a given direction and subsequent starts in that direction, without any feeling of discomfort to occupants of the car.

When the car is brought to an initial stop and the direction switch contacts open to disconnect generator field winding GLF from the supply lines, another circuit is established for this field winding through contacts U3 and D3 to balance out the effects of residual flux in the final stopping operation. If the car initially approaches the floor at which the stop is being made in the up direction, the circuit for the field winding is through resistance 1GSFR, contacts 1R3, winding GLF, and contacts 1R2, U3 and D3. Since this is a reversal of the excitation provided for operating the car in the up direction, the excitation provided by this circuit acts to balance out the excitation of the generator due to residual flux. Similarly, if the car is traveling in the down direction, the circuit is through resistance 1GSFR, contacts 1R1, winding GLF, and contacts 1R4, U3 and D3. Here again, the excitation is in a direction opposite to that for down-car travel, thus acting to balance out the generator excitation due to the residual flux. When the circuit for generator field winding GLF is broken at contacts U2 and U4 or at contacts D2 and D4, the balance between the motor C. E. M. F. and the generator voltage is changed. This gives rise to a change in current in the armature circuit and thus a change in the torque of the motor to effect a reduction of force on the motor. If the motor is lifting, say full load, the change is such as to reduce the generator voltage and thus the armature current and helps to stop the elevator car. If the motor is lowering full load, the reduction in excitation is opposed to the current, since the current flow is negative in the motor armature, generator armature loop circuit. Therefore, the negative current gets larger to help slow down the elevator car. Assuming that the circuit through contacts U3 and D3 is not provided, when the field winding GLF is disconnected from the supply lines, the excitation due to residual remains. Expressing the factors involved in terms of running speed and assuming that the slow leveling speed is 20 F. P. M. of which 10 F. P. M. is due to residual, when the field winding GLF is disconnected from the supply lines, 10 F. P. M. excitation is removed and there remains 10 F. P. M. excitation due to residual. Thus only a 10 F. P. M. change is made in bringing the car to a stop. If the residual were 15 F. P. M. out of a leveling speed of 20 F. P. M. upon disconnection of the auxiliary field winding there is only a reduction in speed of 5 F. P. M. and a higher residual remains, which reduces the stopping action. By providing the circuit through contacts U3 and D3, upon disconnection of field winding GLF from the supply lines by the separation of contacts U2, U4 or D2, D4, a 20 F. P. M. change is produced to reduce the elevator motor speed to zero. If the stop is made from a return of the car to the floor after an overrun, there would be a —30 F. P. M. external excitation and +10 F. P. M. excitation due to residual, giving a resultant excitation of —20 F. P. M. Removing the —30 F. P. M. in stopping and balancing out the residual to remove the +10 F. P. M. reduces the excitation of the generator 20 F. P. M. to reduce the elevator motor speed to zero. In each case the disconnection of the auxiliary field from the supply lines and the balancing of the residual component to reduce the generator excitation increases the electrical braking action due to the change in current in the generator armature-motor armature circuit more quickly to bring the car to a stop.

This arrangement has the advantage of providing quick electrical braking action, as distinguished from the application of the electromechanical brake which inherently has some delay in building up of the stopping force. This enables the final stopping operation to be effected in a very short distance from the floor and thus enables the dead zone to be kept at a minimum.

In higher speed installations, one or more additional residual compensation switches may be provided to take care of the difference in the amount of residual due to the change in hysteresis, which is inherent in one-floor runs and multifloor runs. This has been illustrated by the addition of a second residual compensating switch 2R, which operates in the same manner as switch 1R except at a higher voltage. Switch 2R, upon operation during up car travel, engages contacts 2R2 to short circuit resistance 3GSFR to compensate for the increased effect of the residual flux. This switch remains operated for the remainder of the upward trip so that this resistance remains short circuited, increasing the generator excitation to return the car to the floor in the down direction to compensate for the increased residual flux. Upon the car being started in the down direction and making a multifloor run, switch 2R is reset, causing the separation of contacts 2R2 and the engagement of contacts 2R1. Engagement of contacts 2R1 short circuits resistance 2GSFR to compensate for the increased amount of residual flux. This switch remains reset for the remainder of the downward trip so that resistance 2GSFR remains short circuited, increasing the generator excitation to return the car to the floor in the up direction to compensate for the increased residual flux. This is true regardless of whether the subsequent starts involve one or multifloor runs. If the initial start in the down direction involves a one-floor run, switch 2R is not reset so that contacts 2R1 remain separated. This provides the proper residual compensation for returning the car to the floor on this one-floor run. The fact that contacts 2R2 remain engaged is immaterial, inasmuch as the circuit for field winding GLF through resistance 1GSFR is by way of contacts 1R1.

The establishing of the suicide connection, that is, the connection of a generator field winding across the generator armature with a polarity to oppose the residual flux of the generator field, is delayed to enable the stopping force created by the unbalance of the voltages in the loop circuit to remain effective to electrically stop the elevator car. A delayed suicide arrangement is disclosed in the patent to Lewis et al., No. 2,247,955, granted July 1, 1941. In the present circuits the delayed suicide is effected by the discharge of condenser C1 into the coil of switch H after disconnection of this coil from the supply lines. This maintains a strong motor field by the engagement of contacts H2, prevents weakening of the generator series field winding, if such weakening is utilized, and delays connection of the generator main field winding GMF across the generator armature at contacts H4 until after the car has been brought to a final stop. Also, this obviates interference with the action of balancing out the effects of residual by means of the circuit through contacts U3 and D3 in obtaining a quick, accurate stop at the landing.

While the circuits have been illustrated for an arrangement in which separate circuits are provided for the generator main field winding GMF and the generator auxiliary field winding GLF, it is to be understood that these field windings may be controlled by a common circuit during main operation. Also, in certain instances a single separately excited field winding may be provided for the generator. These and other changes may be made without departing from the spirit and scope of the invention, and it is intended that all matter contained in the above description or shown in the accompanying drawings shall be interpreted as illustrative, and not in a limiting sense.

What is claimed is:

1. In combination; an elevator car serving a plurality of floors; a direct current hoisting motor for said car; a direct current generator for supplying current to said motor at variable voltage, said generator having a field winding; a source of direct current for said field winding, a first circuit for said field winding; means for connecting said field winding to said source through said first circuit for operation of said car; means for leveling the car with a floor; an additional circuit for said field winding; and means responsive to said leveling means upon movement of the car from said floor in the opposite direction from that in which it approached said floor for reversing the connection of said field winding to said source through said first circuit and for connecting said field winding to said source through said additional circuit in parallel with said first circuit to cause excitation of said field winding to compensate for the residual flux of the generator.

2. In combination; an elevator car serving a plurality of floors; a direct current hoisting motor for said car; a direct current generator for supplying current to said motor at variable voltage, said generator having a main field winding and an auxiliary field winding; a source of direct current for said field windings; means for starting said car, said starting means comprising circuits for connecting said field windings to said source and for thereafter increasing the voltage applied to the main field winding to increase the car speed; means for decreasing the voltage applied to said main field winding to slow down the car; means for leveling the car with a floor; means operable during leveling for disconnecting said main field winding from said source; an additional circuit for said auxiliary field winding; and means responsive to said leveling means upon movement of the car from said floor in the opposite direction from that in which the car initially approached said floor for reversing the connection of said auxiliary field winding to said source through its first-named circuit and for connecting it to said source through said additional circuit in parallel with its first-named circuit to cause excitation of said auxiliary field winding to compensate for the residual flux of the generator.

3. In combination; an elevator car serving a plurality of floors; a direct current hoisting motor for said car; a direct current generator for supplying current to said motor at variable voltage, said generator having a main field winding and an auxiliay field winding; a source of direct current for said field windings; means for starting said car; said starting means comprising circuits for connecting said field windings to said source and for thereafter increasing the voltage applied to the main field winding to increase the car speed; means for decreasing the voltage applied to said main field winding to slow down the motor; means for leveling the car with a floor;

means operable during leveling for disconnecting said main field winding from said source; an additional circuit for said auxiliary field winding; and means connecting said additional circuit across said supply lines in parallel with said auxiliary field winding during operation of said leveling means when said car is moving in the same direction with respect to said floor as the car initially approached said floor and responsive to said leveling means upon movement of the car from said floor in the opposite direction from that in which the car approached said floor for reversing the connection of said auxiliary field winding to said source through said first-named circuit and for connecting it to said source through said additional circuit in parallel with its first-named circuit to cause excitation of said auxiliary field winding to compensate for the residual flux of the generator.

4. In combination; an elevator car serving a plurality of floors; hoisting ropes for said car; a direct current hoisting motor for said car; a direct current generator for supplying current to said motor at variable voltage, said generator having a field winding; a source of direct current for said field winding; a circuit for connecting field winding to said source; an additional circuit for connecting said field winding to said source; means for leveling the car with a floor; means responsive to said leveling means in causing movement of the car in the same direction as the car initially approached said floor for connecting said field winding through the first-named circuit to said source with a polarity for operation in that direction and responsive to said leveling means upon movement of the car from said floor in the opposite direction from that in which the car initially approached said floor for reversing the connection of said field winding to said source through said first-named circuit and for connecting it to said source through said additional circuit in parallel with its first-named circuit to cause excitation of said field winding to compensate for the residual flux of the generator; resistance in said additional circuit; and means for controlling said resistance to cause, upon operation of said leveling means to return the car to the floor in a direction opposite to that in which it initially approached the floor, excitation of said field winding to be greater when the return is from the car overrunning the floor than when the return is from the car moving away from the floor due to change in the length of the hoisting ropes.

5. In combination; an elevator car serving a plurality of floors; a direct current hoisting motor for said car; a direct current generator for supplying current to said motor at variable voltage, said generator having a field winding; a source of direct current for said field winding; a circuit for connecting said field winding to said source; an additional circuit for connecting said field winding to said source; means for controlling the direction of travel of the car; means for starting the car in a direction determined by said direction controlling means; means responsive to an initial start of the car for travel in a given direction for connecting said field winding through the first-named circuit to said source with a polarity for operation in said given direction and for connecting said additional circuit in parallel with said first-named circuit to increase the excitation of said winding to compensate for the residual flux of the generator due to previous operation of the car in the opposite direction; and means responsive to the car attaining a certain speed for disconnecting said additional circuit from in parallel with said first-named circuit and connecting it in parallel with said field winding and for maintaining said speed responsive means in operated condition so that said additional circuit is connected in parallel with said field winding for each succeeding start of the car in said given direction.

6. In combination; an elevator car serving a plurality of floors; a direct current hoisting motor for said car; a direct current generator for supplying current to said motor at variable voltage, said generator having a field winding; a source of direct current for said field winding; a circuit for connecting said field winding to said source; an additional circuit for connecting said field winding to said source; means for controlling the direction of travel of the car; means for starting the car in a direction determined by said direction controlling means; means responsive to an initial start of the car in a given direction for connecting said field winding through the first-named circuit to said source with a polarity for operation in said given direction and for connecting said additional circuit in parallel with said first-named circuit to increase the excitation of said field winding to compensate for the residual flux of the generator due to previous operation of the car in the opposite direction; means responsive to the car attaining a certain speed for disconnecting said additional circuit from in parallel with said first-named circuit and connecting it in parallel with said field winding and for maintaining said speed responsive means in operated condition for the remainder of the travel in said given direction so that said additional circuit is connected in parallel with said field winding for each succeeding start of the car in said given direction; leveling mechanism operable to reverse the connections of said field winding to cause return of the car to the floor in the direction opposite to said given direction and to reconnect said additional circuit in parallel with said first-named circuit in circuit with said field winding for said return operation.

7. In combination; an elevator car serving a plurality of floors; a direct current hoisting motor for said car; a direct current generator for supplying current to said motor at variable voltage, said generator having a field winding; a source of direct current for said field winding; a circuit for connecting said field winding to said source; an additional circuit for connecting said field winding to said source; means for leveling the car with a floor; means responsive to said leveling means in causing movement of the car in the same direction as the car initially approached said floor for connecting said field winding through the first-named circuit to said source with a polarity for operation in that direction and responsive to said leveling means upon movement of the car from said floor in the opposite direction from that in which the car initially approached said floor for reversing the connection of said field winding to said source through said first-named circuit and for connecting it to said source through said additional circuit in parallel with its first-named circuit to cause excitation of said auxiliary field winding to compensate for the residual flux of the generator; and means for disconnecting said field winding from said source through said first-named circuit and for connecting it to said source through said additional circuit with the polarity and amount of excitation such as to balance out the effects of residual flux of the generator.

8. In combination; an elevator car serving a plurality of floors; a direct current hoisting motor for said car; a direct current generator for supplying current to said motor at variable voltage, said generator having a field winding; a source of direct current; an electromechanical brake having a release coil; means for connecting said field winding and brake release coil to said source for starting the car; and means for disconnecting said field winding and said brake release coil from said source and for connecting said field winding for excitation of a polarity and amount such as to balance out the effects of residual flux of the generator in stopping the car.

9. In combination; an elevator car serving a plurality of floors; a direct current hoisting motor for said car; a direct current generator for supplying current to said motor at variable voltage, said generator having a field winding; a source of direct current; a circuit for said field winding; an additional circuit for said field winding; an electromechanical brake; means for causing release of said brake and for connecting said field winding to said source by way of said first-named circuit for starting the car; means for causing release of said brake and for connecting said field winding to said source by way of said first and additional circuits in parallel with reverse polarity for moving said car with respect to a floor in the opposite direction to that in which it initially approached that floor; and means for stopping the car at a floor comprising means for causing application of said brake and for disconnecting said field winding from said source by way of said first-named circuit and for connecting said field winding to said source by way of said additional circuit with a polarity and amount of excitation such as to balance out the effects of residual flux of the generator.

10. In combination; an elevator car serving a plurality of floors; a direct current hoisting motor for said car; a direct current generator for supplying current to said motor at variable voltage, said generator having a field winding; a source of direct current; a circuit for said field winding; an additional circuit for said field winding; means for connecting said field winding to said source by way of said first-named circuit for starting the car; means for connecting said field winding to said source by way of said first and additional circuits in parallel with reverse polarity for moving said car with respect to a floor in the opposite direction to that in which it initially approached that floor; means for stopping the car at a floor comprising means for disconnecting said field winding from said source by way of said first-named circuit and for connecting said field to said source by way of said additional circuit with a polarity and amount of excitation such as to balance out the effects of residual flux of the generator; and means operable upon expiration of a given time delay after operation of said stopping means for disconnecting said field winding from said source and for connecting it across the generator armature with a polarity to oppose the residual flux of the generator.

11. In combination; an elevator car serving a plurality of floors, a direct current hoisting motor for said car; a direct current generator for supplying current to said motor at variable voltage, said generator having a field winding; a source of direct current; direction determining means for a circuit for said field winding; an additional circuit for said field winding; direction circuits for connecting said field winding to said source by way of said first-named circuit for starting the car in a direction determined by said direction determining means; a residual compensation switch controlled by the value and polarity of the generator voltage and having contacts for connecting said field winding to said source by way of said additional circuit in parallel with said first-named circuit by way of direction contacts for moving said car with respect to a floor in the opposite direction to that in which it initially approached that floor; and means for stopping the car at a floor comprising means for disconnecting said field winding from said source by way of said direction contacts and for connecting said field winding to said source by way of said additional circuit through contacts of said residual compensation switch with a polarity and amount of excitation such as to balance out the effects of residual flux of the generator.

12. In combination; an elevator car serving a plurality of floors; a direct current hoisting motor for said car; a direct current generator for supplying current to said motor at variable voltage, said generator having a field winding; a source of direct current for said field winding; a circuit for connecting said field winding to said source; an additional circuit for connecting said field winding to said source; means for starting the car; means responsive to said starting means for connecting said field winding to said source by way of said first-named circuit for a polarity of excitation in accordance with the desired direction of car travel; a switch operable in response to an initial start of the car in a given direction and the car attaining a certain speed, said switch thereafter remaining latched in operated condition; means responsive to starting the car in the opposite direction and the car attaining a certain speed for resetting said switch; means responsive when said switch is operated to starting said car in said given direction for connecting said additional circuit in parallel with said field winding to said source and to starting said car in the opposite direction for connecting said additional circuit in parallel with said first-named circuit in circuit with said field winding to increase the excitation of said field winding to compensate for the residual flux of the generator due to previous operation of the car in said given direction; and means responsive when said switch is reset to starting said car in said opposite direction for connecting said additional circuit in parallel with said field winding to said source and to starting said car in said given direction for connecting said additional circuit in parallel with said first-named circuit in circuit with said field winding to increase the excitation of said field winding to compensate for the residual flux of the generator due to previous operation of said car in said opposite direction.

13. In combination; an elevator car serving a plurality of floors; a direct current hoisting motor for said car; a direct current generator for supplying current to said motor at variable voltage, said generator having a field winding; a source of direct current for said field winding; a circuit for connecting said field winding to said source; resistance in said circuit; an additional circuit for connecting said field winding to said source; resistance in said additional circuit; means for starting the car; means responsive to said starting means for connecting said field winding to said source by way of said first-named circuit for a polarity of excitation in accordance with the desired direction of car travel; a switch having an operating coil connected across the generator armature and operable in response to an initial start of the car in a given direction and the generator attaining a certain voltage, said switch thereafter being retained in operated condition by residual magnetism so long as the car remains set for travel in said given direction; a circuit for said switch connecting its operating coil across the generator armature and responsive to starting the car in the opposite direction and the generator attaining a certain voltage for overcoming said residual magnetism to reset said switch; and means responsive when said switch is operated to starting said car in said given direction and when said switch is reset to starting said car in said opposite direction for connecting said additional circuit to said source with said resistance therein in parallel with said field winding and responsive when said switch is operated to starting said car in the opposite direction and when said switch is reset to starting said car in said given direction for connecting said additional circuit in circuit with said field winding with said resistance therein in parallel with said resistance in said first named circuit to increase the excitation of said field winding to compensate for the residual flux of the generator.

14. In combination; an elevator car serving a plurality of floors; a direct current hoisting motor for said car; a direct current generator for supplying current to said motor at variable voltage, said generator having a field winding; a source of direct current for said field winding; starting means for the car; means responsive to said starting means for connecting said field winding to said source to start said car; a switch operated in response to an initial start of the car in a given direction and the generator attaining a certain voltage; means for retaining said switch, once operated, in operated condition; means responsive when said switch is operated to starting said car in the opposite direction for increasing the voltage applied to said field winding to compensate for the residual flux of the generator; a second switch operated in response to an initial start of the car in said given direction and the generator attaining a higher than said certain voltage; means for retaining said second switch, once operated, in operated condition; and means operable when said second switch is operated, upon starting of the car in said opposite direction, for still further increasing the voltage applied to said field winding to compensate for the increased residual flux of the generator.

15. In combination; a elevator car serving a plurality of floors; a direct current hoisting motor for said car; a direct current generator for supplying current to said motor at variable voltage, said generator having a field winding; a source of direct current for said field winding; resistance for said field winding; additional resistance for said field winding; means for starting the car; means responsive to said starting means for connecting said field winding to said source through said first-named resistance for a polarity of excitation in accordance with the desired direction of car travel; a latching switch operated in response to an initial start of the car in a given direction and the generator attaining a certain voltage, and reset in response to starting the car in the opposite direction and the generator attaining a certain voltage; means responsive when said switch is operated to starting said car in said given direction and when said switch is reset to starting said car in said opposite direction for connecting said additional resistance in parallel with said field winding and responsive when said switch is operated to starting said car in said opposite direction and when said switch is reset to starting said car in said given direction for connecting said additional resistance in parallel with said first-named resistance in circuit with said field winding to increase the excitation of said field winding to compensate for the residual flux of the generator; a second latching switch operated in response to an initial start of the car in said given direction and the generator attaining a higher than said certain voltage and reset in response to starting the car in said opposite direction and the generator attaining a higher than said certain voltage; and means operable by said second switch when operated, upon starting of the car in said opposite direction, and when reset, upon starting of the car in said given direction, for decreasing the amount of said additional resistance connected in parallel with said first resistance in circuit with said field winding.

16. In combination; an elevator car serving a plurality of floors; a direct current hoisting motor for said car; a direct current generator for supplying current to said motor at variable voltage, said generator having a field winding; a source of direct current for said field winding; a circuit for said field winding; resistance in said circuit; an additional circuit for said field winding; resistance in said additional circuit; means for starting the car; means responsive to said starting means for connecting said field winding to said source by way of said first-named circuit for a polarity of excitation in accordance with the desired direction of car travel; a switch having an operating coil connected across the generator armature and operable in response to an initial start of the car in a given direction and the generator attaining a certain voltage, said switch thereafter being retained in operated condition by residual magnetism so long as the car remains set for travel in said given direction; a circuit for said switch connecting its operating coil across the generator armature and responsive to starting the car in the opposite direction and the generator attaining a certain voltage for overcoming said residual magnetism to reset said switch; means responsive when said switch is operated to starting said car in said given direction and when said switch is reset to starting said car in said opposite direction for connecting said additional circuit to said source with said resistance therein in parallel with said field winding and responsive when said switch is operated to starting said car in said opposite direction and when said switch is reset to starting said car in said given direction for connecting said additional circuit in circuit with said field winding with said resistance therein in parallel with said resistance in said first-named circuit to increase the excitation of said field winding to compensate for the residual flux of the generator; a second switch having an operating coil connected across the generator armature and operable in response to an initial start of the car in said given direction and the generator attaining a higher than said certain voltage, said switch thereafter being retained in operated condition by residual magnetism so long as the car remains set for travel in said given direction; a circuit for said switch connecting its operating coil across the generator armature and responsive to starting the car in said opposite direction and the generator attaining a higher than said certain voltage for overcoming said residual magnetism to reset said switch; and means operable by said second switch when operated, upon starting of the car in said opposite direction, and operable by said second switch when reset, upon starting of the car in said given direction, for decreasing the amount of said resistance in said additional circuit connected in parallel with said resistance in said first-named circuit in circuit with said field winding.

<center>No references cited.</center>